(12) United States Patent
Altieri et al.

(10) Patent No.: US 11,725,999 B2
(45) Date of Patent: Aug. 15, 2023

(54) METHODS AND SYSTEMS FOR MEASURING TORQUE USING SENSOR CALIBRATION

(71) Applicant: LORD Corporation, Cary, NC (US)

(72) Inventors: Russell Altieri, Holly Springs, NC (US); Daniel Kakaley, Cary, NC (US); Charles Clifton, Cary, NC (US); Warren Brannan, Sanford, NC (US); Mark Jolly, Raleigh, NC (US); Sanjeev Sachan, Cary, NC (US)

(73) Assignee: LORD Corporation, Cary, NC (US)

( * ) Notice: Subject to any disclaimer, the term of this patent is extended or adjusted under 35 U.S.C. 154(b) by 236 days.

(21) Appl. No.: 17/268,353

(22) PCT Filed: Aug. 14, 2019

(86) PCT No.: PCT/US2019/046457
§ 371 (c)(1),
(2) Date: Feb. 12, 2021

(87) PCT Pub. No.: WO2020/037019
PCT Pub. Date: Feb. 20, 2020

(65) Prior Publication Data
US 2021/0247259 A1     Aug. 12, 2021

Related U.S. Application Data

(60) Provisional application No. 62/718,600, filed on Aug. 14, 2018.

(51) Int. Cl.
*G01L 25/00* (2006.01)
*G01L 3/10* (2006.01)

(52) U.S. Cl.
CPC ............ *G01L 25/003* (2013.01); *G01L 3/101* (2013.01); *G01L 3/109* (2013.01)

(58) Field of Classification Search
CPC ........ G01L 3/101; G01L 25/003; G01L 3/109
See application file for complete search history.

(56) References Cited

U.S. PATENT DOCUMENTS 4,183,242 A * 1/1980 Brown ................... G01L 3/101
73/862.328
4,453,420 A * 6/1984 Nakane ................. G01P 3/4815
73/862.326

(Continued)

FOREIGN PATENT DOCUMENTS

CN   102072738   *  5/2011
FR    2846412    *  4/2004

(Continued)

OTHER PUBLICATIONS

International Search Report and Written Opinion for Application No. PCT/US2019/046457 dated Nov. 13, 2019.

*Primary Examiner* — Octavia Davis Hollington
(74) *Attorney, Agent, or Firm* — Kdw Firm PLLC

(57) ABSTRACT

Systems and methods for measuring torque on a drive train component of a rotating drive system are disclosed. In some aspects, a system includes a target assembly, a sensor assembly, and a sensor processing unit. The sensor assembly is located proximate to the target assembly, and the sensor assembly includes sensors mounted radially around the shaft and configured to detect sensor targets as the target assembly rotates with the drive train component. The sensor processing unit is configured for receiving sensor signals from the sensor assembly and outputting a torque signal based on the sensor signals. The sensor processing unit is configured for receiving target calibration data for the target assembly and sensor calibration data for the sensor assembly. The sensor processing unit is configured for verifying that the target (Continued)

calibration data corresponds to the target assembly and that the sensor calibration data corresponds to the sensor assembly.

21 Claims, 12 Drawing Sheets

(56) References Cited

U.S. PATENT DOCUMENTS

| | | | |
|---|---|---|---|
| 4,602,515 A | 7/1986 | Eichenlaub | |
| 5,456,123 A * | 10/1995 | Parkinson | G01L 3/12 73/1.09 |
| 5,675,095 A * | 10/1997 | Ballantyne | G01L 3/1435 73/862.328 |
| 6,776,058 B1 * | 8/2004 | Schroeder | G01L 3/109 73/862.333 |
| 7,093,504 B2 | 8/2006 | Southward | |
| 9,752,942 B2 * | 9/2017 | Jolly | G01L 3/101 |
| 10,837,848 B2 * | 11/2020 | Janisch | G01D 5/2053 |
| 10,955,302 B2 * | 3/2021 | Appleton | G01L 3/109 |
| 2017/0356822 A1 | 12/2017 | Glessibl | |
| 2018/0003578 A1 * | 1/2018 | Leonard | B60R 16/0232 |
| 2022/0146344 A1 * | 5/2022 | Jolly | G01L 3/101 |

FOREIGN PATENT DOCUMENTS

| | | |
|---|---|---|
| WO | WO 2008/086102 A1 | 7/2008 |
| WO | WO 2020/037019 A1 | 2/2020 |

* cited by examiner

METHODS AND SYSTEMS FOR MEASURING TORQUE USING SENSOR CALIBRATION

CROSS-REFERENCE TO RELATED APPLICATIONS

This application claims the benefit of U.S. Provisional Patent Application Ser. No. 62/718,600, filed Aug. 14, 2018, the disclosure of which is incorporated herein by reference in its entirety.

TECHNICAL FIELD

The subject matter described in this specification relates to methods and systems for measuring torque using sensor calibration, for example, in rotating drive shaft systems of machinery such as propulsion systems found on helicopters and fixed wing aircraft.

BACKGROUND

Many types of machines include a rotatable shaft. For example, electric motors, internal combustion engines, power generation equipment and transmissions of vehicles and manufacturing machines typically include one or more drive shafts or flexible couplings. For example, in many aircraft, land vehicles and marine vehicles, the torque of a rotating drive shaft system is measured, and the torque measured is used in safety-critical uses such as torque limiting, clutch engagement, operator feedback, component lifetime monitoring, and so on. Consequently, there is a need for systems and methods of accurately measuring torque in rotating drive shaft systems.

SUMMARY

Systems and methods for measuring torque on a drive train component of a rotating drive system are disclosed. In some aspects, a system includes a target assembly, a sensor assembly, and a sensor processing unit. The sensor assembly is located proximate to the target assembly, and the sensor assembly includes sensors mounted radially around the shaft and configured to detect sensor targets as the target assembly rotates with the drive train component. The sensor processing unit is configured for receiving sensor signals from the sensor assembly and outputting a torque signal based on the sensor signals. The sensor processing unit is configured for receiving target calibration data for the target assembly and sensor calibration data for the sensor assembly. The sensor processing unit is configured for verifying that the target calibration data corresponds to the target assembly and that the sensor calibration data corresponds to the sensor assembly.

In one aspect a system for measuring torque on a drive train component of a rotating drive system is provided. The system comprises a target assembly, a sensor assembly, and a sensor processing unit. The target assembly is configured to rotate with the drive train component, wherein the target assembly comprises two target wheels, wherein each target wheel comprises a plurality of sensor targets circumferentially distributed around the target wheel. The sensor assembly is located proximate to the target assembly, the sensor assembly further comprising a plurality of sensors mounted radially around the drive train component and configured to detect the sensor targets as the target assembly rotates with the drive train component. The sensor processing unit is configured for receiving sensor signals from the sensor assembly and outputting a torque signal based on the sensor signals, wherein the sensor processing unit is configured for receiving target calibration data for the target assembly and sensor calibration data for the sensor assembly, and wherein the sensor processing unit is configured for verifying that the target calibration data corresponds to the target assembly and that the sensor calibration data corresponds to the sensor assembly.

In another aspect, a method for reconfiguring a system for measuring torque is provided. The method comprises establishing the system with a first target assembly on a rotating drive system, a sensor assembly, and a sensor processing unit, wherein the first target assembly is configured to rotate with a drive train component, wherein the first target assembly comprises two target wheels, wherein each target wheel comprises a plurality of sensor targets circumferentially distributed around each target wheel, and wherein the sensor assembly comprises a plurality of sensors mounted radially around the drive train component and configured to detect the plurality of sensor targets as the first target assembly rotates with the drive train component; verifying, by the sensor processing unit, first target calibration data for the first target assembly and verifying sensor calibration data for the sensor assembly; receiving, by the sensor processing unit, sensor signals from the sensor assembly and outputting a torque signal based on the sensor signals, the first target calibration data, and the sensor calibration data; replacing the first target assembly with a second target assembly and uploading second target calibration data for the second target assembly to the sensor processing unit; and verifying, by the sensor processing unit, the second target calibration data for the second target assembly.

In still another aspect, a method for reconfiguring a system for measuring torque is provided. The method comprises establishing the system with a target assembly on a rotating drive system, a first sensor assembly, and a sensor processing unit, wherein the target assembly is configured to rotate with a drive train component, wherein the target assembly comprises two target wheels, wherein each target wheel comprises a plurality of sensor targets circumferentially distributed around each target wheel, and wherein the first sensor assembly comprises a plurality of sensors mounted radially around the drive train component and configured to detect the plurality of sensor targets as the target assembly rotates with the drive train component; verifying, by the sensor processing unit, target calibration data for the target assembly and verifying first sensor calibration data for the first sensor assembly; receiving, by the sensor processing unit, sensor signals from the first sensor assembly and outputting a torque signal based on the sensor signals, the target calibration data, and the first sensor calibration data; replacing the first sensor assembly with a second sensor assembly and uploading second sensor calibration data for the second sensor assembly to the sensor processing unit; and verifying, by the sensor processing unit, the second sensor calibration data for the second sensor assembly.

DETAILED DESCRIPTION

This specification describes systems and methods for measuring torque using sensor calibration, for example, in rotating drive shafts of vehicle propulsion systems. Torque measurement technology can include sensor systems configured for measuring torque using calibration data, e.g., calibration data determined pre-measurement. Using calibration data can enable highly accurate torque measurements, which can in turn enable accurate torque measurement for use in safety-critical applications.

A system for measuring torque on a drive train component of a rotating drive system includes a target assembly, a sensor assembly, and a sensor processing unit. The calibration data for both sensor assemblies and the target assemblies are generated from measurements of individual sensor assemblies and individual target assemblies. The calibration data matched with those individual assemblies is used by the sensor processing unit to enable output of a highly-accurate torque signal. The highly-accurate torque signal can be suitable for use, e.g., in safety-critical applications and other applications where high accuracy is desired. To properly configure the system, a sensor processing unit receives calibration data that is matched to the particular sensor assembly and the particular target assembly implemented in the system.

An improper configuration of the system could be considered a significant failure if an erroneous, but in-range signal was to go undetected. A mismatched calibration data file could lead to this type of failure. Therefore, to promote a high level of safety, it can be useful to make the calibration files easy to install and to enforce a verification method to check that the target assembly and sensor assembly calibration data being used by the sensor processing unit matches the target assembly and sensor assembly that is physically installed.

In some applications, it may be required to separately maintain the target assembly, the sensor assembly and the sensor processing unit. In those applications, it may be useful to have a calibration method that enables interchangeability of these three system elements. To accomplish this, separate calibration files for the target assembly and the sensor assembly can be installed and verified.

Figure 1:
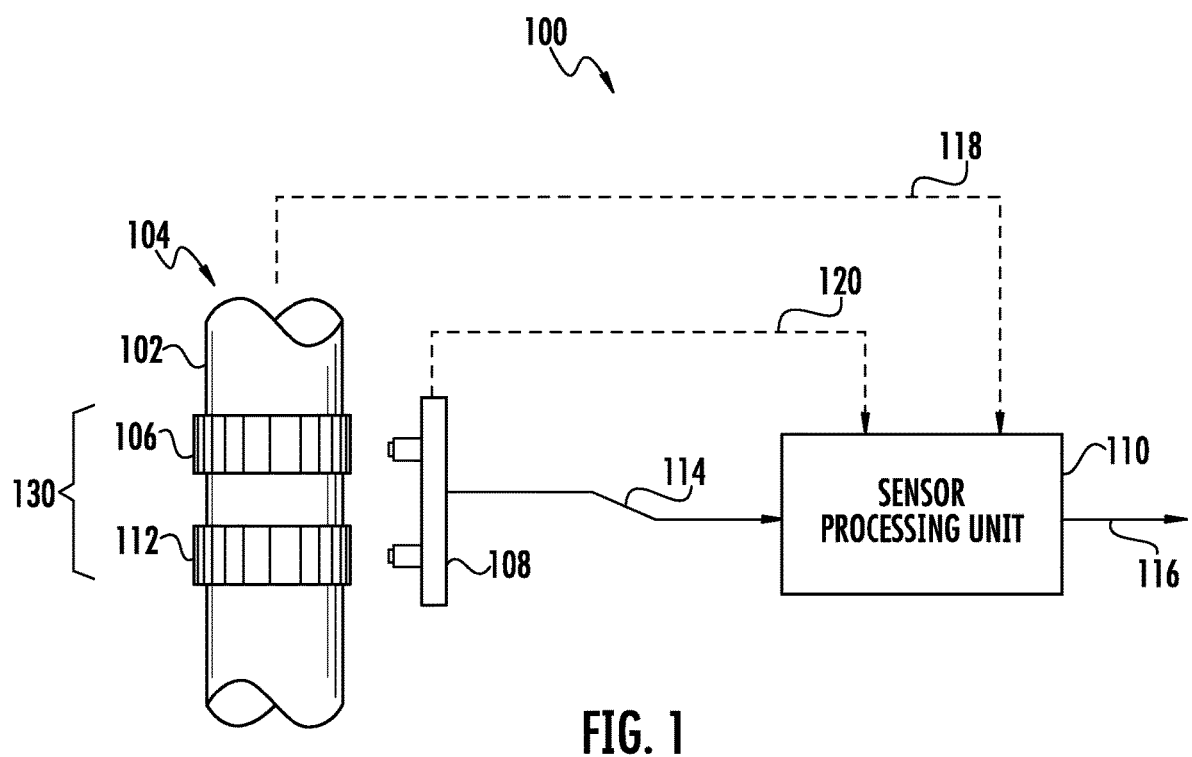
FIG. 1 illustrates an example system for measuring torque on a shaft of a rotating drive system.

FIG. 1 illustrates an example system 100 for measuring torque on a shaft 102 of a rotating drive system 104. The system 100 includes a target wheel assembly 130 comprising two target wheels 106 and 112, a sensor assembly 108, and a sensor processing unit 110. The target assembly consisting of target wheels 106 and 112 is configured to rotate with the shaft 102. The sensor assembly 108 generally does not rotate with the shaft 102. Although FIG. 1 illustrates a shaft 102, in general, the system 100 can be used for measuring torque on any appropriate drive train component, e.g., a shaft or a coupling.

The target wheels 106 and 112 include sensor targets circumferentially distributed around the target wheels 106 and 112. The sensor targets are, for example, conductive targets, optical targets, ferrous (magnetically permeable) targets, or combinations of these. When sensor targets are positionable in the target wheels 106 and 112, the representative targets are positioned in a variety of possible configurations to embed calibration data in the target assembly itself. Such configurations include, but are not limited to, spacing, orientation, tooth width, and other possible configurations discussed below in reference to FIG. 2B. Examples of circumferentially distributed sensor targets are described further below with reference to FIGS. 2A and 2B. Examples of suitable target assemblies are provided in U.S. Pat. No. 7,093,504 Col. 22, 5:26. U.S. Pat. No. 7,093,504 is hereby incorporated by reference in its entirety.

The sensor assembly 108 is located proximate to the target assembly 130. The sensor assembly includes one or more sensors mounted radially around the shaft 102 and configured to detect the sensor targets as the target wheels 106 and 112 rotate with the shaft 102. The sensors are positioned proximate the shaft 102 without touching the shaft 102, creating a space such as an air gap. In examples where the system 100 is used with a coupling, the sensors can be machined into the coupling.

Each of the sensors can include, e.g., a passive inductive sensor such as a variable reluctance (VR) sensor, a non-contact active inductive sensor such as a differential variable reluctance transducer (DVRT), an optical sensor, a microwave sensor, a capacitive proximity sensor, a Hall sensor, or any other appropriate type of sensor. The sensor assembly 108 may be affixed to machine structure such as a housing or shroud that encloses the shaft 102, or it may be affixed to a cradle. The sensors can be mounted in any appropriate circumferential pattern including uniform or non-uniform circumferential spacing. An example of a sensor assembly is provided in U.S. Pat. No. 7,093,504 Col. 1, 39:59.

The sensor processing unit 110 is configured to receive sensor signals 114 from the sensor assembly 108 and output a torque signal 116 based on the sensor signals 114. The sensor processing unit 110 can output the torque signal 116 to, e.g., a computer system such as an aircraft control system or safety monitoring system. The sensor processing unit 110 is configured for measuring timing data associated with the rotation of the target assembly 130 using the sensor signals 114 and for determining twist then, based on the twist, the torque signal 116 based on the timing data and shaft stiffness. The sensor processing unit 110 can be implemented using any appropriate computing technology. For example, the sensor processing unit 110 can be implemented as memory storing executable instructions and one or more processors programmed to compute the torque signal 116, or the sensor processing unit 110 can be implemented as a field programmable gate array (FPGA) or application specific integrated circuit (ASIC).

The sensor processing unit 110 is configured for receiving target calibration data 118 for the target assembly 130 and sensor calibration and verification data 120 for the sensor assembly 108. The sensor processing unit 110 is configured for verifying that the target calibration data 118 corresponds to the target assembly 130 and that the sensor calibration data 120 corresponds to the sensor assembly 108. For example, the unique verification data 118 can be used to distinguish the target assembly 130 from other target assemblies sharing a same assembly design, and the unique sensor verification data 120 can be used to distinguish the sensor assembly 108 from other sensor assemblies sharing a same assembly design.

In some examples, the target calibration data 118 includes slope and offset characteristics associated with the target assembly 130. The slope typically corresponds to the pre-determined torque per unit twist between the target wheels. The offset typically corresponds to the pre-determined rotational misalignment from wheel to wheel. These two values uniquely characterize the target assembly 130 in comparison to other wheel assemblies sharing a same design. A number of wheel assemblies may have different parameters due to, e.g., variability of shaft stiffness or wheel assembly installation as a result of the manufacturing process.

In some examples, the target calibration and verification data 118 is embedded as bitwise data in the sensor targets. The sensor assembly 108 can then be configured to read the bitwise data and provide the bitwise data to the sensor processing unit 110. The sensor processing unit 110 can then be configured for decoding the bitwise data received from the sensor assembly. The data encoded into the target wheel can include either calibration data, or verification data, or both. If the target wheel contains both calibration data and verification data, then the calibration and verification methods can become automatic without manual intervention. Embedded bitwise data is described further below with reference to FIG. 2B. In some examples, the target assembly 130 includes an additional target wheel axially displaced from the sensor targets and embedded with bitwise data, and one or more additional sensors of the sensor assembly 108 are configured to read the bitwise data and provide the bitwise data to the sensor processing unit 110, e.g., as shown in FIGS. 3 and 4.

In some examples, the sensor processing unit 110 is configured for verifying the target calibration data 118 by identifying a unique timing pattern embedded in one or both target wheels of the target assembly 130. For example, verification information for target calibration data 118 can be embedded in the target assembly 130 by virtue of irregular spacing between the sensor targets (i.e., resulting in a harmonic fingerprint while the shaft is rotating) resulting from machining imperfections. In another example, verification information for target calibration data 118 can be embedded in the target assembly 130 by virtue of irregularities purposefully machined into the sensor targets.

Figure 5:
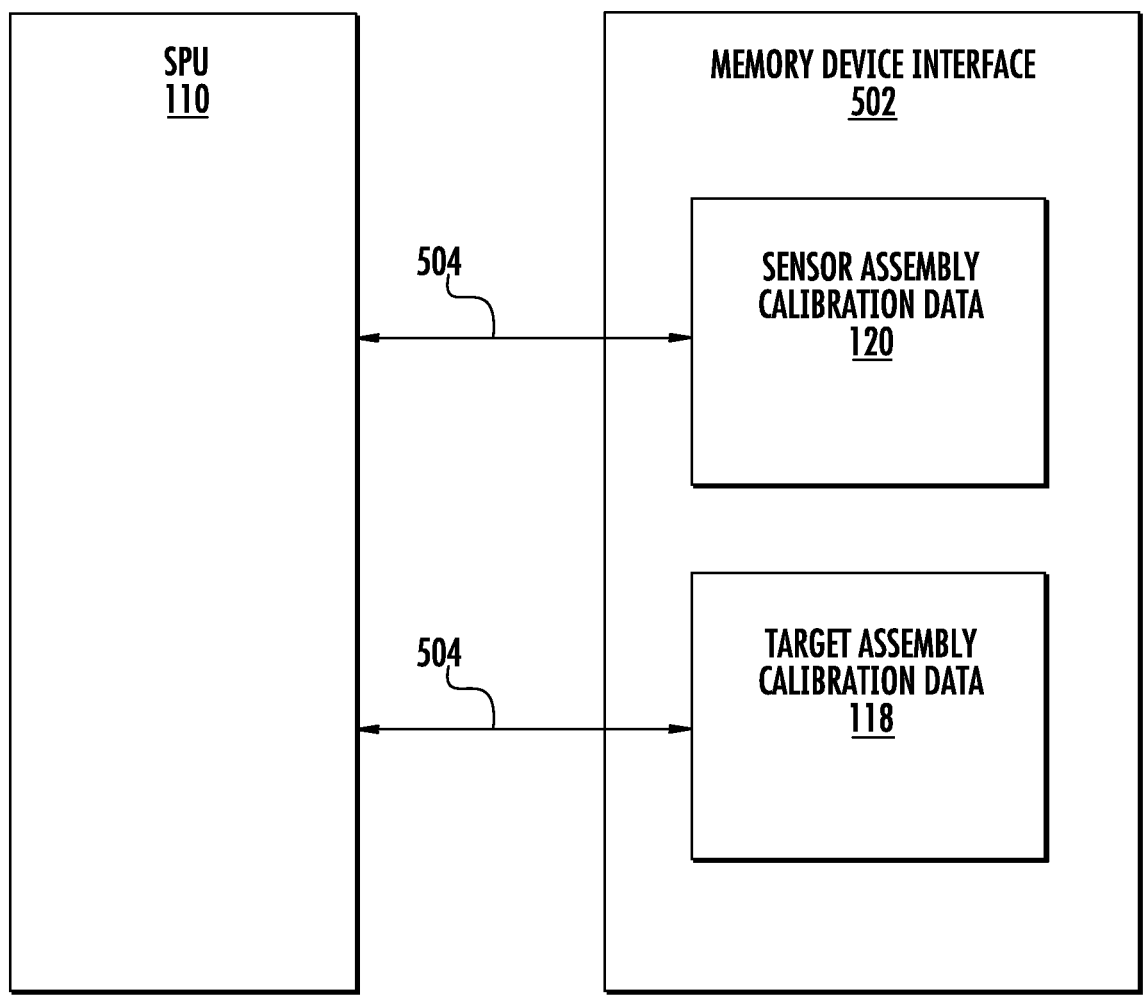
FIG. 5 shows an example memory device interface for the sensor processing unit.

In general, the sensor processing unit 110 can receive the verification data using any appropriate computing and communication technology. For example, the system 100 can include first and second portable memory devices coupled to first and second slots that electrically interface with the sensor processing unit 110. The sensor processing unit 110 can then be configured to receive the target calibration data 118 from the first memory device and the sensor calibration data 120 from the second memory device. The first and second slots can be located, e.g., within the sensor processing unit 110 as shown in FIG. 5, or remotely from the sensor processing unit 110, in which case the first and second slots can electrically interface with the sensor processing unit 110 through, e.g., a cable.

Figure 3:
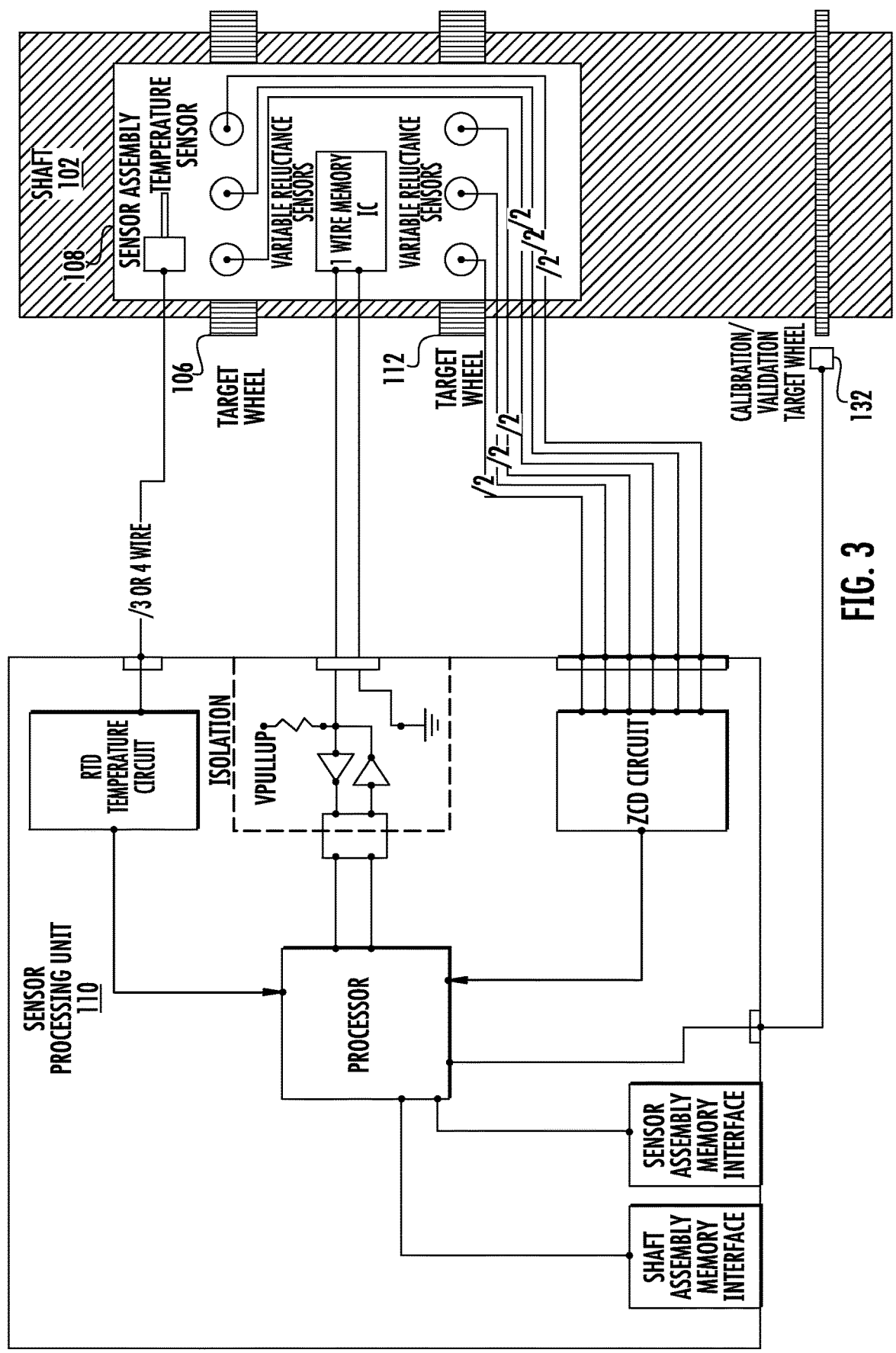
FIG. 3 is a block diagram illustrating an example system architecture for the system.
Figure 4:
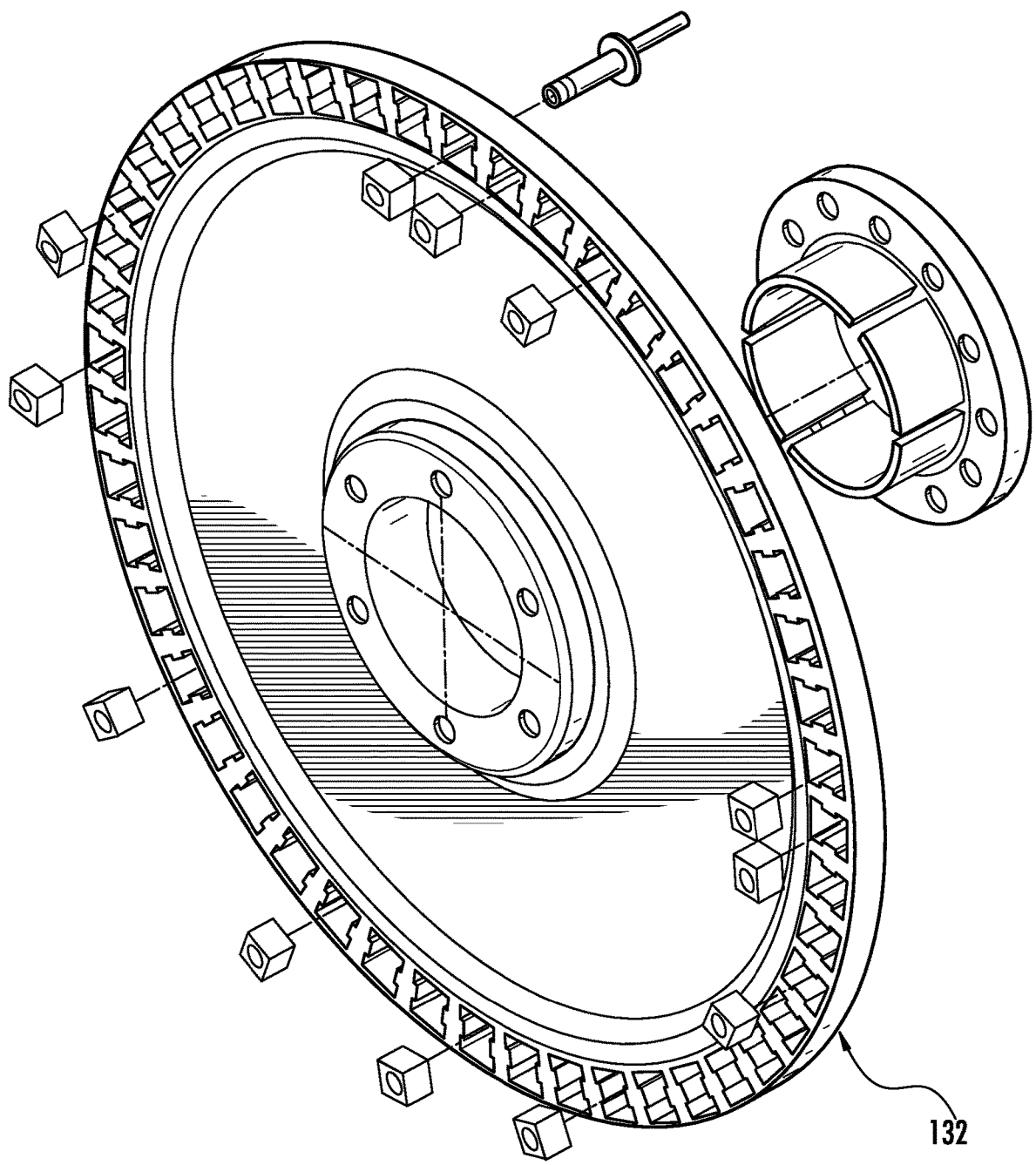
FIG. 4 shows an example additional target wheel.

The system 100 can include an external memory device embedded in the sensor assembly 108 and electrically coupled to the sensor processing unit 110 through a communications port, e.g., as shown in FIG. 3. Then, the sensor processing unit 110 can be configured for receiving the sensor calibration data from the memory device. The sensor processing unit 110 can also be configured for verifying that the sensor calibration data corresponds to the sensor assembly by outputting the verification data read from the memory device to be confirmed by crew or aircraft systems.

In some examples, the sensor assembly 108 includes a sensor assembly connector comprising electrical pins with unique cross-resistance values, i.e., values unique to each manufactured sensor assembly of a number of different sensor assemblies sharing a same design. Then, the sensor processing unit 110 can be configured for reading the unique cross-resistance values and using the unique cross-resistance value to verify that the sensor calibration file used by the sensor processing unit corresponds to the particular sensor assembly 108.

Figure 2A:
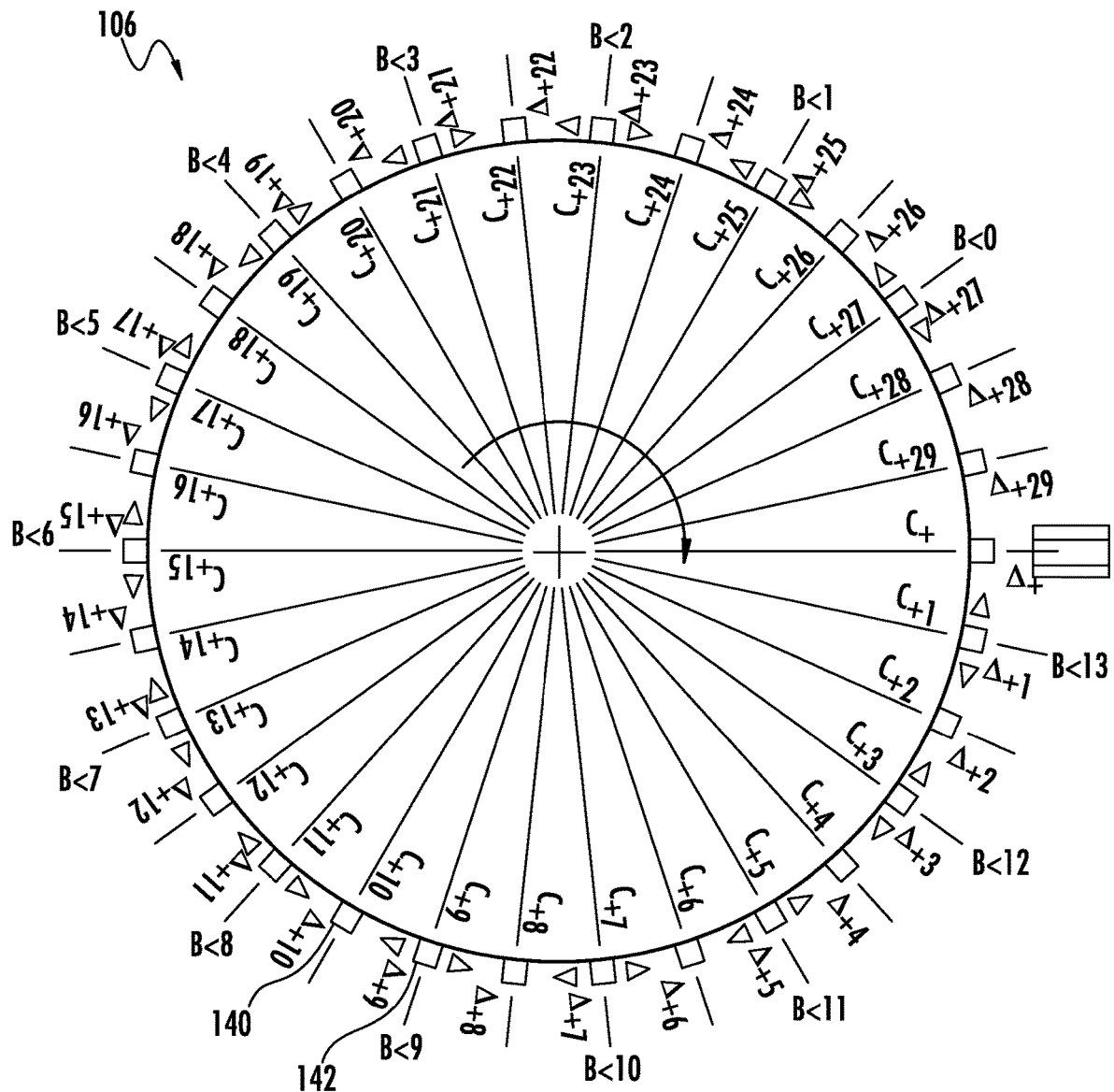
FIG. 2A illustrates an example target assembly that includes sensor targets mounted circumferentially around the shaft.
Figure 2B:
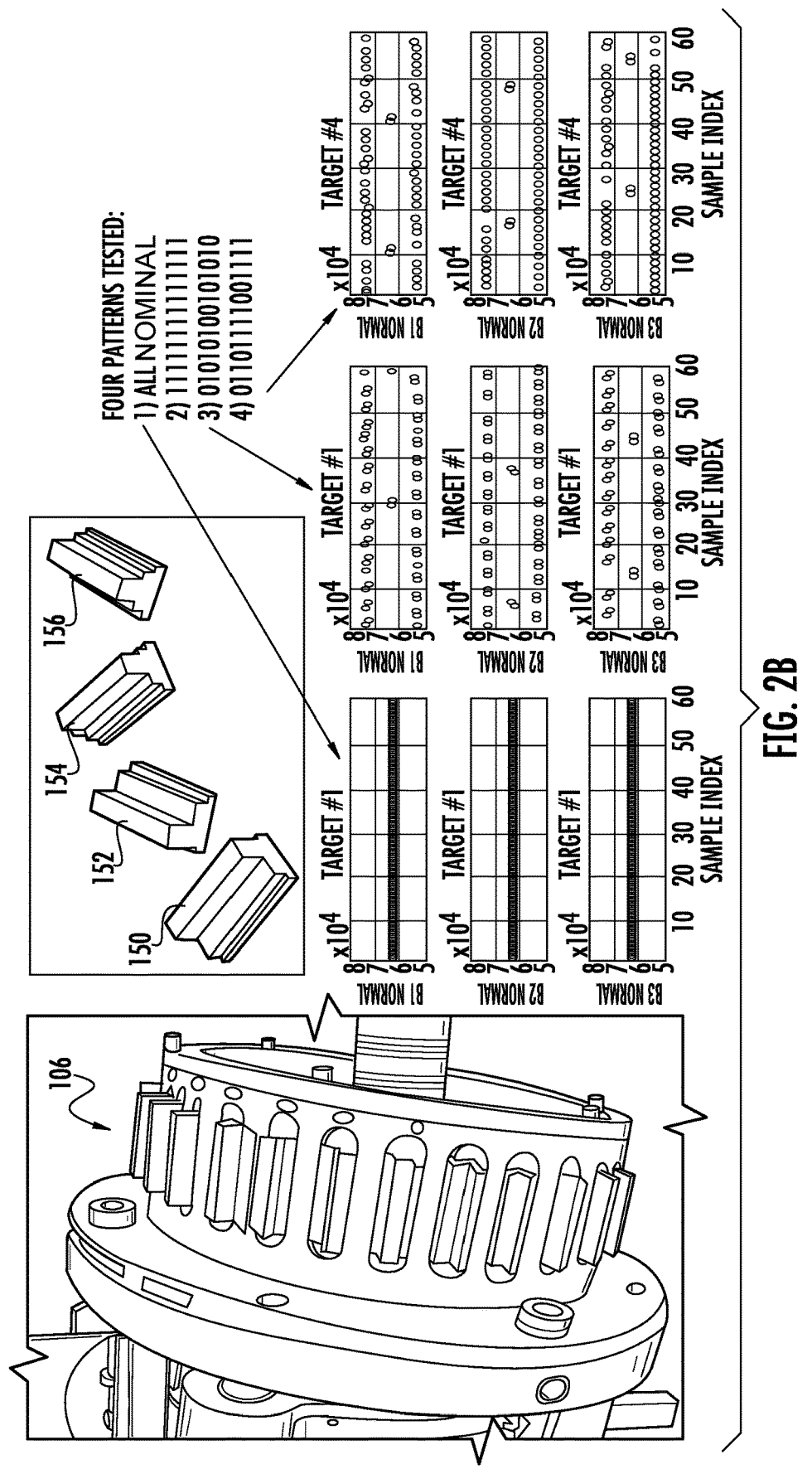
FIG. 2B shows an example target assembly and four example bit patterns that can be embedded into the target assembly.

FIG. 2A illustrates an example target wheel 106 that includes sensor targets (e.g., sensor targets 140 and 142) mounted circumferentially around the shaft 102. As shown in FIG. 2A, some of the sensor targets (e.g., sensor target 140) are circumferentially distributed at regular spacings, and some of the sensor targets (e.g., sensor target 142) are machined with an angular offset (lead or lag) to embed bitwise data within the target wheel. For example, a ½ tooth-width lead can indicate bit=1 and a ½ tooth-width lag can indicate bit=0. In this example, 14 bits of data can be provided, bit 0-bit 13. Bit information can be recovered by comparing appropriate tooth-to-tooth deltas: $(\Delta_k < \Delta_{k-1}) \rightarrow 1$. The sensor targets positioned at regular spacings can be used to provide a reference indicating the start of a bit sequence, e.g., by placing three successive targets at regular intervals. FIG. 2B shows an example target wheel 106, four example sensor targets 150, 152, 154, and 156, and four example bit patterns that can be embedded into the target wheel.

FIG. 3 is a block diagram illustrating an example system architecture for the system 100 of FIG. 1. The system 100 includes a processor configured to read calibration data from external memory devices for the target assembly and the sensor assembly, an resistance temperature device (RTD) circuit, a zero crossing detection (ZCD) circuit configured for measuring timing deltas between detected sensor target passages, and an isolation circuit configured, via a pull-up resistor, for coupling to a 1-Wire memory integrated circuit (IC) of the sensor assembly. The system 100 can receive sensor assembly calibration data, sensor assembly verification data, or both from the 1-Wire memory IC located in the sensor assembly, and target calibration data, verification data, or both, from an additional target wheel on the shaft. If both the calibration data and verification data are stored in the 1 Wire Memory or each sensor assembly, and the calibration data and verification data for the shaft are stored in the additional target wheel, then the system 100 becomes completely automatic in loading calibration data and verifying the data.

The additional target wheel is a separate shaft-mounted ring which contains calibration data. For example, the additional target wheel can store slope associated with the torque per unit twist and rotational offset of the target assembly, a serial number, and cyclical redundancy check (CRC) information for correctness, or other error-detecting coded data for verification.

In general, the system 100 can receive calibration data using any of several appropriate techniques. The example architecture illustrated in FIG. 3 is provided for purposes of illustration. The calibration data can also include verification data that is unique to the target assembly or sensor assembly. This unique verification data could include any of the following: a CRC (Cyclic Redundancy Check) of the calibration data, a Serial Number of the item calibrated, a unique ID number, a unique characteristic of the calibrated item, such as a harmonic shaft fingerprint, unique timing pattern, or measure of specific tolerances of a machined part. As it is included with the calibration data read by the sensor processing unit, the verification data can used to determine if the calibration data matches the item calibrated. Several examples are described below. This verification step can avoid mismatched or incorrect calibration data used to calculate torque in addition to other system outputs.

Consider the following examples for sensor calibration data. In some examples, a calibration file is created for each sensor assembly of a number of different sensor assemblies, and then the calibration file can be downloaded to the sensor processing unit 110 using a computer or other ground support equipment, e.g. a tablet. In some examples, a calibration file is created for each sensor assembly and stored in a memory device (e.g., EEPROM) embedded in each sensor assembly. Then, the data in the calibration file can be provided to the sensor processing unit 110, e.g., using a 2-wire interface such as a 1-Wire EEPROM, using a 4-wire interface such as an I2C EEPROM, using a 6-wire interface such as an I2C EEPROM, or using a 10-wire interface such as a serial peripheral interface (SPI) EEPROM. In some examples, a calibration connector plug storing calibration data is installed at a maintenance panel, e.g., in avionics applications. In some examples, a calibration connector plug storing calibration data is installed in the sensor processing unit 110.

Consider the following examples for target calibration data. In some examples, a calibration file is created for each target assembly, and then the calibration file can be downloaded to the sensor processing unit 110 using a computer or other ground support equipment, e.g. a tablet. In some examples, the calibration data is embedded into the sensor targets. In some examples, the calibration data can be printed as a barcode on a shaft, which can then be read by a barcode reader (e.g., optical or magnetic) or read with a sensor such a laser in the sensor assembly. In some examples, the calibration data is stored in a radio frequency identifier (RFID) or other near field communication (NFC) tag on the shaft, which can then be read by a NFC reader. In some examples, a standard non-unique value can be used for the torque per unit twist and rotational offset based on a statistically sampled average of target assembly characteristics.

FIG. 4 shows an example additional target wheel 132, i.e., a target wheel in addition to or comprising of one or more of the two target wheels 106 and 112 described with reference to FIG. 1 to embed calibration data in the target assembly 130 for reading by the sensor processing unit 110. The additional target wheel 132 can be constructed with the methods described with reference to FIG. 2A and FIG. 2B to embed calibration data into the additional target wheel 132. The additional target wheel 132 includes a disc with calibration data embedded into the disc, e.g., embedded by virtue of variations in the physical shape of the disc.

FIG. 5 shows an example external memory device interface 502 for the sensor processing unit 110. The memory device interface 502 can include a data communications bus 504 for receiving target assembly calibration data 118 and sensor assembly calibration data 120. In some examples, the data communications bus 504 is implemented as two connections, e.g., I2C connections or any appropriate connections.

Consider an example where the target calibration data and sensor calibration data are stored on a memory device that can be installed inside the sensor processing unit 110. An external memory device is a device, such as an I2C connected device, that matches to a slot in the sensor processing unit 110. The device can take the form of a token, key, SD cards, or similar. For embedded electronics products, a simple memory interface (SPI or I2C) has an advantage for certification over a memory device built for a PC, such as an SD card or USB Stick. An example external memory device is the Datakey product manufactured by ATEK Access Technologies.

Consider an example where sensor assembly and target assembly calibration data associated with a particular sensor assembly or target assembly is determined during target and sensor assembly and then stored in a file in a database, and where each sensor assembly and each target assembly has a unique identifier such as a serial number or ID number. At the time of installation on the aircraft, the calibration data associated with the physically installed sensor assembly and physically installed target assembly would be accessed from the database and stored in the signal processing unit using a computer or other ground support equipment, e.g. a tablet, or directly via the aircraft communication interfaces. The signal processing unit 110 can be configured to output the unique serial number and/or ID number for the purposes of installation confirmation/verification by the crew or by the aircraft systems. In some examples, the data files could be stored on external memory devices such as a flash drive or compact disk (CD) and be inserted in the programming equipment for installation on the signal processing unit.

Consider an example where each sensor assembly and each target assembly have a unique identifier such as a serial number or ID number, and that number is visible as installed on the aircraft. In some examples, the serial number and/or the ID number associated with the calibration file stored within the signal processing unit output by the signal processing unit to a maintenance tool or the aircraft system. This number is then cross-compared manually to the visible serial number or ID number by the aircraft crew for the purposes of installation confirmation/verification. In some examples, the signal processing unit can cross-compare target assembly and sensor assembly verification data with another signal processing unit when multiple redundant signal processing units share a common sensor assembly for the purposes of installation confirmation/verification. In some examples, calibration data for more than one sensor assembly is contained within the calibration data file and is installed in the signal processing unit. In this example, pin strappings (loopbacks) in the harness between the sensor assembly and the signal processing unit define which calibration data set the signal processing unit will use.

Consider an example where two target wheels are installed on a shaft or two target wheels are machined into a coupling. In this example, small variations in the machining and installation on shafts and machining on couplings can lead to steady state error in measured twist and as a result contribute to steady state error in torque. In this example, a process (calibration) is used to determine this variation for each target assembly such that the signal processing unit can correct the steady state error. The process for target assemblies involves spinning the shaft at a zero-torsional load condition and measuring the offset using an array of sensors. In some examples, the steady state error as measured by the signal processing unit varies with speed. This leads to steady state torque errors at off-nominal speeds. In this example, a process (calibration) is used to determine this variation for each target assembly over a range of speeds such that the signal processing unit can correct the steady state error. The variation data is converted (to calibration data) and stored on the calibration data file associated with the target assembly.

Consider an example where two target wheels are installed on a shaft or two target wheels are machined into a coupling. In this example, small variations in the material properties and manufacturing process can lead to differences in the twist per unit torque imparted between the target wheels and as a result contribute to error as a function of torsional load. In this example, a process (calibration) is used to determine the particular twist per unit torque each target assembly such that the signal processing unit can correct the torsional load-based error. The process for target assemblies involves statically (i.e. not spinning) imputing known torque values into the shaft and measuring the resultant twist between the target wheels with a physical measurement device such as a e.g. dial indicator or linear voltage differential transducer (LVDT). In some examples, the twist per unit torque varies with temperature due to the material properties of the shaft or coupling. In this example, a process (calibration) is used to determine this variation for each target assembly over a range of temperatures such that the signal processing unit can correct the error. The variation data is converted (to calibration data) and stored on the calibration data file associated with the target assembly.

Consider an example where sensors are installed in a sensor assembly for the purposes of sensing the passage of targets on target wheels within a target assembly. In this example, small variations in the manufacturing process of the sensor assembly and variations in the electrical characteristics of the sensors can lead to differences in measured twist between the target wheels and as a result contribute to torque output error. In this example, a process (calibration) is used to determine the sensor to sensor angular variation such that the signal processing unit can correct the error. The process for sensor assemblies involves using the sensor assembly to measure a spinning target assembly at a zero-torsional load condition and measuring the timing offset on each sensor, relative to the other sensors. In some examples, the steady state error as measured by the signal processing unit varies with speed. This leads to steady state torque errors at off-nominal speeds. In this example, a process (calibration) is used to determine this variation for each sensor assembly over a range of speeds such that the signal processing unit can correct the steady state error. The variation data is converted (to calibration data) and stored on the calibration data file associated with the sensor assembly.

In some examples, the measured twist varies with temperature due to the material properties of the sensor assembly or mount. In this example, a process (calibration) is used to determine this variation for each sensor assembly over a range of temperatures such that the signal processing unit can correct the error. The variation data is converted (to calibration data) and stored on the calibration data file associated with the sensor assembly.

Consider an example where a target assembly or sensor assembly needed to be repaired. By using the method described with reference to FIG. 10, the repair can be calibrated offsite against the reference standard components, and sent back into service paired with new calibration data. The reference calibration method allows target assemblies and sensor assemblies that have never been tested together to achieve proper calibration. Multiple reference files and/or reference components can be created for robustness and assuring that calibration can always be accurate, even if a reference unit is damaged.

Storing all the data in the sensor assembly can be useful for simplicity, but a 1-Wire memory IC can be limiting in the amount of data storage. A larger-capacity memory interface usually requires more wires for interfacing with devices such as an I2C memory IC, or a SPI memory IC. These larger-capacity memory devices may require a circuit board, whereas the 1-Wire IC consists of only the data-wire and a ground-wire, which could enable a memory device without a circuit board.

In some examples, the target calibration data can be validated using a normalized sector length. Suppose that each shaft has uniquely machined teeth that are positioned at slightly different distances away from each other. For an N-toothed shaft, for example, there would be N repeating timer counts representing the delta timing of successive target passages. If this pattern is averaged over many revolutions, the sensor processing unit 110 can identify the target assembly by the unique characterization of the machining pattern of the target wheel (i.e., a harmonic fingerprint).

Measured timing data can be filtered at a single harmonic of the shaft rotational frequency (such as 1P, 2P, 3P . . . NP). After the filter, a demodulation is applied at that specific harmonic including. This results in a real and imaginary term that corresponds to the specific machining tolerances of the target assembly.

This process can then be repeated for each harmonic. The resulting vector of complex numbers (the harmonic fingerprint) will be unique to each target assembly. It can then be compared to complex vector stored with the target assembly calibration data to verify that the correct calibration data is being used.

Figure 7:
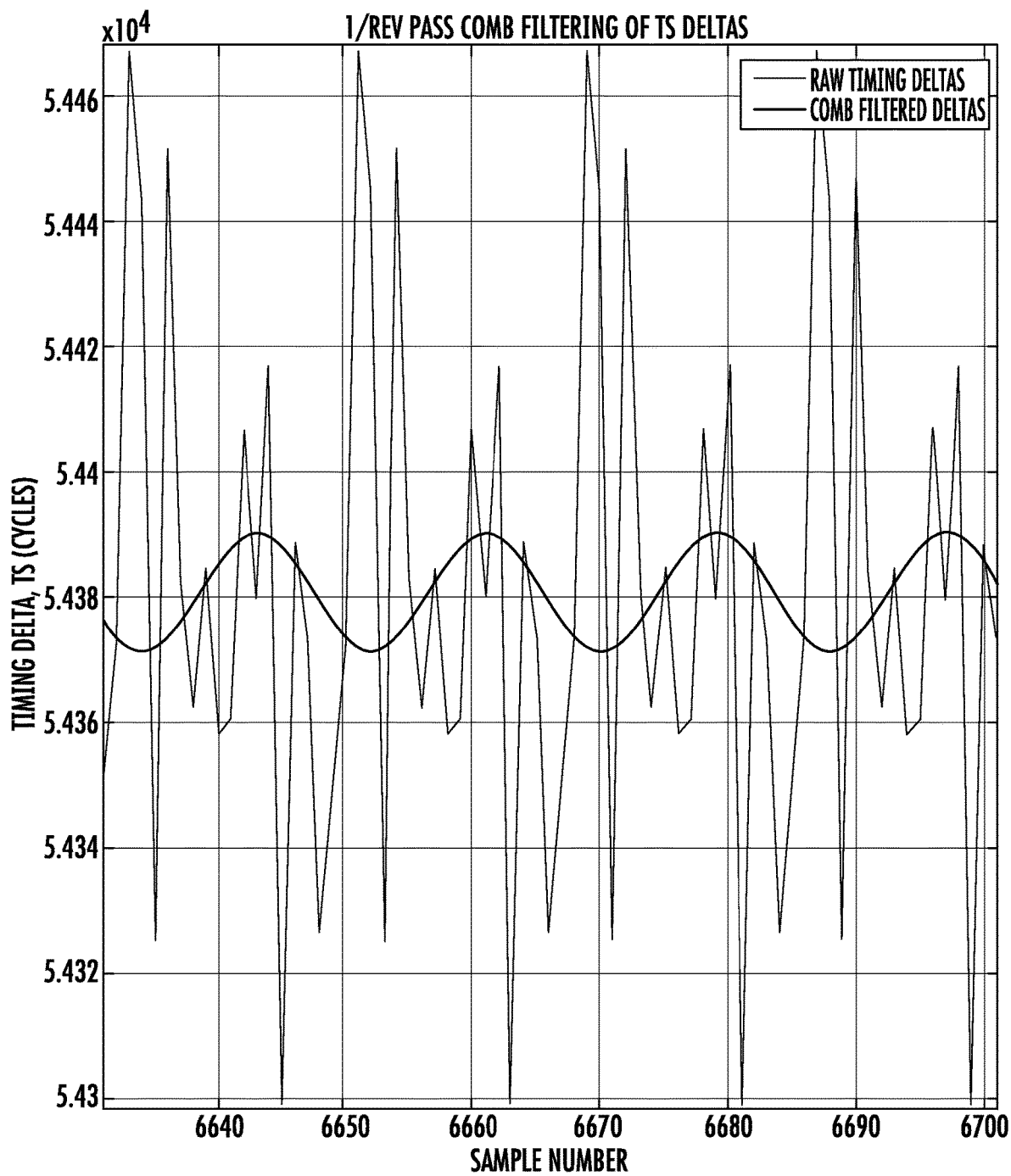
FIG. 7 is a chart showing example sampled timing values of target passages and 1/Rev filtered timing values.

If this was performed for the 1P harmonic of a target assembly with uniformly distributed random machining tolerances, it would result in timing variations shown in FIG. 7 (raw timing deltas). FIG. 7 is a chart showing example timing differences between detections of sensor targets and 1P filtered timing differences. These variations are then filtered to isolate the 1P content shown in FIGS. 8A-8B.

Figure 8A:
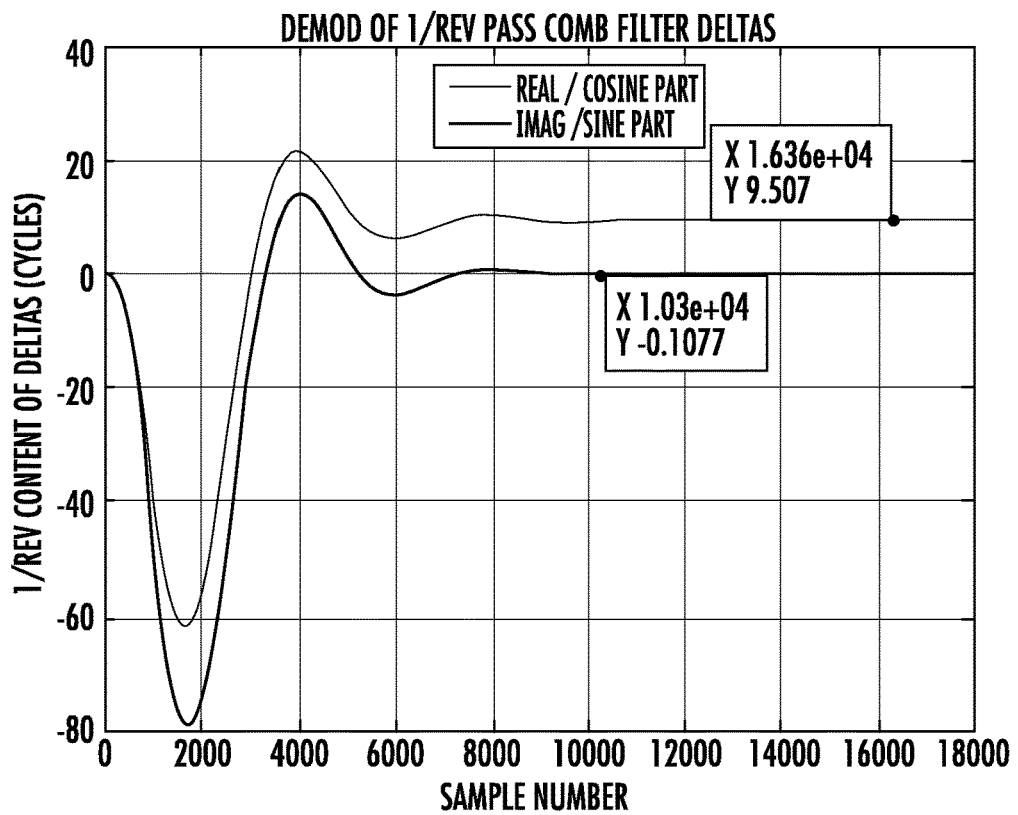
FIGS. 8A and 8B show two separate simulations of passages of targets on machined target wheels which result in two distinct amplitudes and phases.
Figure 8B:
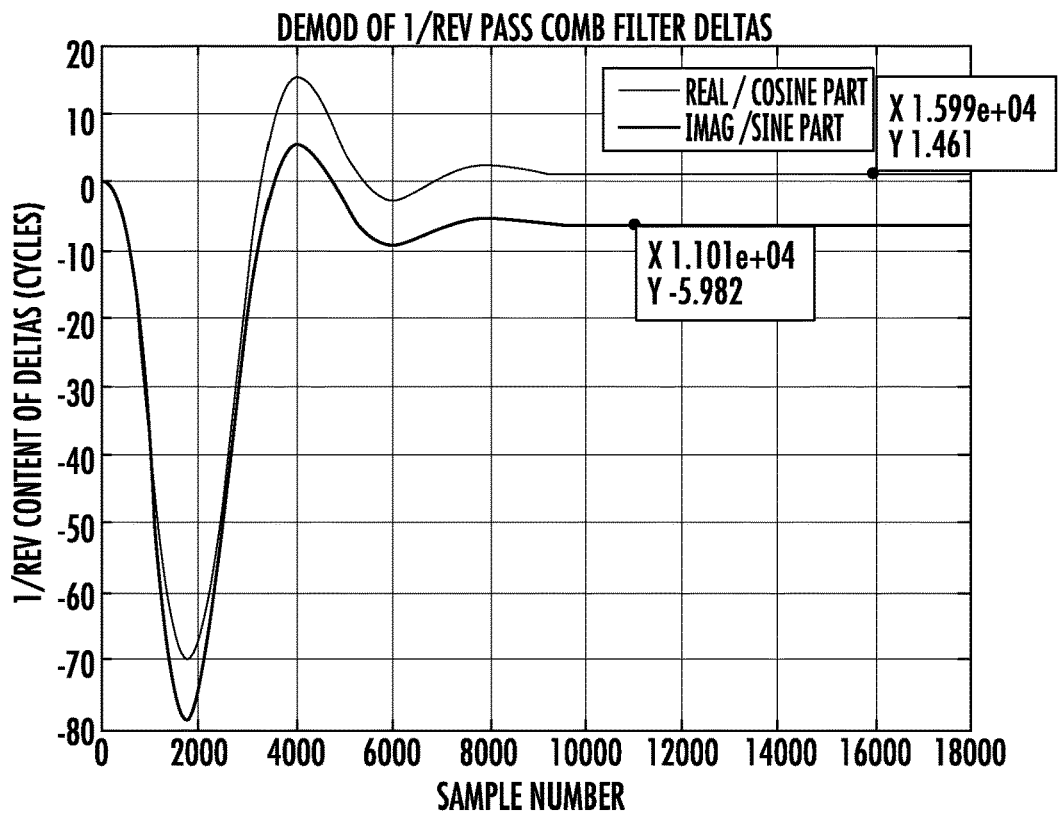

The 1P content possesses an amplitude and phase which are unique to the specific geometry. FIGS. 8A and 8B show two separate simulations of tooth tolerance which result in two distinct amplitudes and phases of the 1P content. FIG. 8A is a chart showing example 1P content of timing deltas between sensor signal ZCDs. FIG. 8B is also a chart showing example 1P content of timing deltas between sensor signal ZCDs but for a different target assembly. FIGS. 8A-8B show different randomized tolerances and how those tolerances contain unique amplitude and phase information of the 1P harmonic content.

Figure 6:
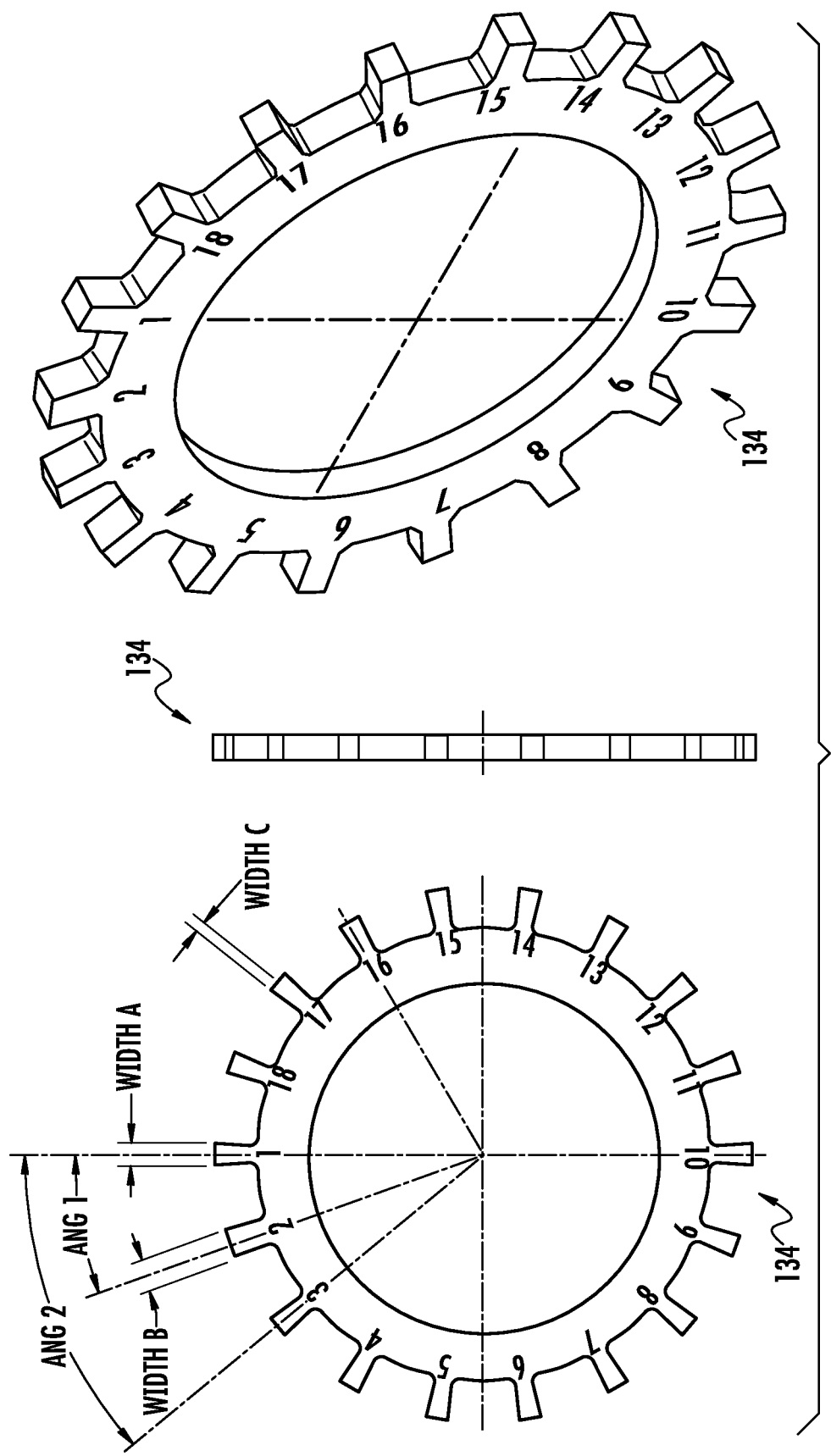
FIG. 6 shows three views of an example target wheel having toothed sensor targets with variable tooth width.

FIG. 6 shows three views (front view on the left, side view in the center, and isometric view on the right) of an example target wheel 134 having toothed sensor targets with variable tooth widths; this is an alternative method to that described in FIGS. 2A and 2B where the tooth position is modified to store calibration data. Varying the tooth widths can be used to embed calibration data or verification data or both into a target assembly, and can be combined with methods of varying position of teeth. The methods of FIG. 6 can be used in systems described above with reference to FIG. 1 and FIG. 3.

In general, the system 100 includes at least two target wheels. These two target wheels can contain identifiable variable width teeth. Each of the target wheels could be built in many configurations of teeth width. One implementation of this concept is the following. Consider a scenario for target wheels with 18 teeth (in general, a target wheel can have N teeth).

1. Target wheel A has a smaller tooth on target 1.
   a. This creates an identifiable starting target
2. Target wheel A has a smaller tooth on a single tooth, from 2-18
   a. This provides 17 combinations of target wheel A.
3. Target wheel B has a smaller tooth on target 1.
   a. This creates an identifiable starting target
4. Target wheel B has a smaller tooth on a single tooth, from 2-18
   a. This provides 17 combinations of target wheel A.
5. Target wheel A and target wheel B can be clocked at 18 unique clocking positions with respect to one another.

The end result is $(N-1)*(N-1)*N$ (where N=18 number of teeth in the above example) unique target combinations. This data would be used to validate the target assembly calibration file by cross checking the value stored in memory in the signal processing unit.

Figure 9:
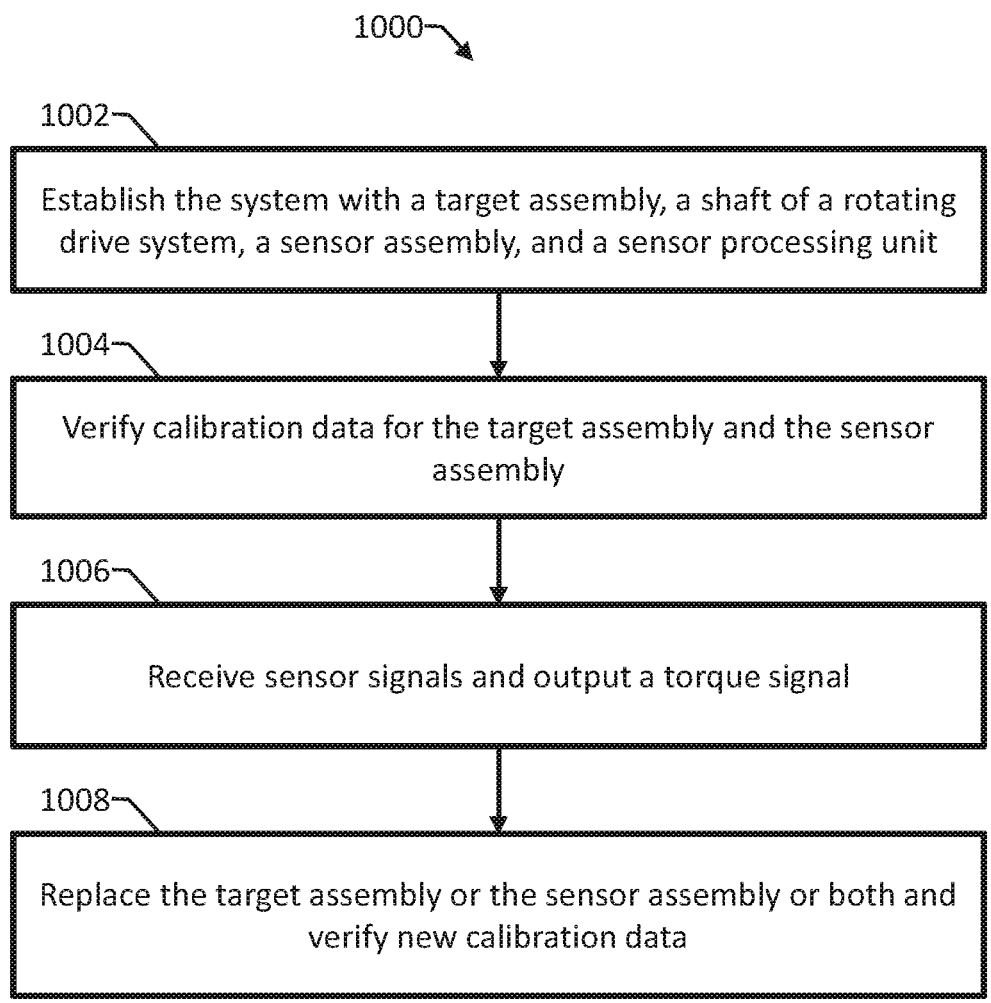
FIG. 9 is a flow diagram of an example method for reconfiguring a system for measuring torque following component replacement.

FIG. 9 is a flow diagram of an example method 1000 for reconfiguring the system 100 of FIG. 1. Since the system 100 is configured for validating calibration data, the target assembly or the sensor assembly can be replaced with confidence that the sensor processing unit 110 will use the appropriate calibration data for any replaced components. The verification performed by the sensor processing unit 110 reduces the risk of operator error, i.e., by allowing for detection of calibration data that does not match a newly configured assembly.

The method 1000 includes establishing the system with a target assembly on a rotating drive system, a sensor assembly, and a sensor processing unit (1002). The method 1000 includes verifying calibration data for the target assembly and the sensor assembly (1004). For example, the method 1000 can include receiving both calibration data and verification data. The calibration data can be downloaded to the sensor processing unit. The verification data can then be read from the signal processing unit to confirm that it corresponds to the physically installed target and sensor assemblies.

For example, target calibration data can be verified by reading verification data in the form of a harmonic fingerprint from the target assembly and determining whether the harmonic fingerprint matches the target calibration data. The method 1000 can include determining that the harmonic fingerprint matches the calibration data if, for example, the value of the harmonic fingerprint is equal to a value stored with the calibration data. Similarly, sensor calibration data can be verified by, e.g., receiving verification data from memory coupled to the sensor assembly using a communications port and determining whether the verification data matches the sensor calibration data.

The method 1000 includes receiving sensor signals and outputting a torque signal based on the sensor signals, the target calibration data, and the sensor calibration data (1006). The method 1000 includes measuring timing data associated with the rotation of the target assembly using the sensor signals and determining the torque signal based on the timing data.

The method 1000 includes replacing the target assembly or the sensor assembly or both, downloading (installing) new calibration data for any replaced components, and verifying the new calibration data for any replaced components (1008). If the new calibration data cannot be successfully verified, the sensor processing unit 110 can communicate an error, e.g., by sending a message or displaying an error message on a display screen of a computer or the aircraft systems displays.

Figure 10:
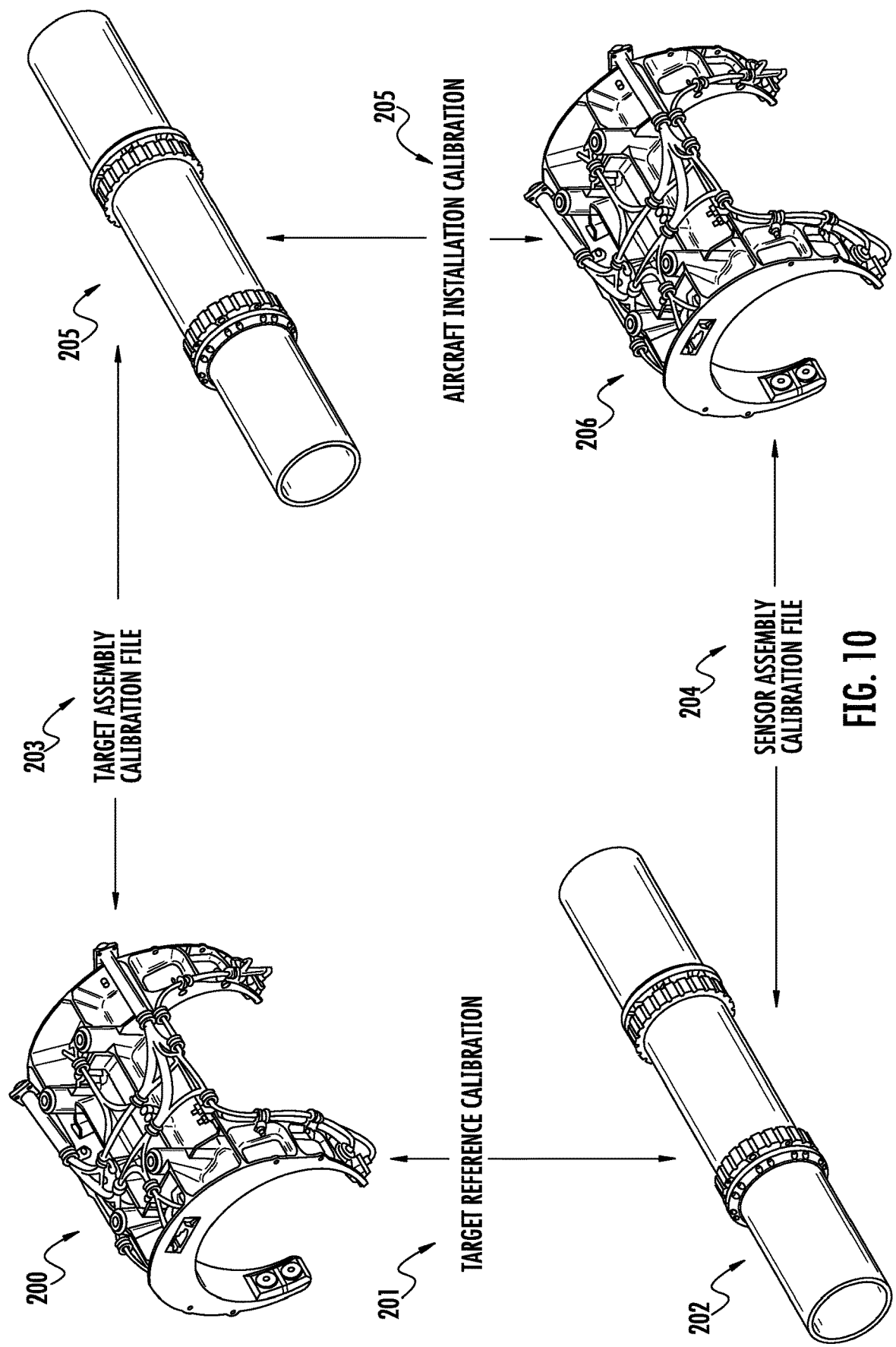
FIG. 10 illustrates an example method for using reference calibration data and reference target and sensor assemblies.

FIG. 10 illustrates an example method for using reference calibration data and reference target and sensor assemblies. The method enables sensor assemblies and target assemblies to be interchangeably calibrated by the reference calibration data.

The method uses a reference calibration sensor assembly 200 and a reference calibration target assembly 202. The reference calibration sensor assembly 200 can have the same structure as the sensor assembly 108 of FIG. 1, and the reference calibration target assembly 202 can have the same structure as the target assembly 130 of FIG. 1.

A reference calibration file 201 is characterized between the reference sensor assembly 200 and the reference calibration target assembly 202. The reference calibration file 201 stores calibration values for the combination of the reference calibration sensor assembly 200 and the reference calibration target assembly 202. Then, the reference calibration sensor assembly 200 and the reference calibration target assembly 202 can be used to calibrate other combinations of sensor assemblies and target assemblies, without requiring those other combinations to be individually characterized.

For example, the reference calibration sensor assembly 200 and the reference target assembly 202 can be stored and saved for calibrating other assemblies, i.e., instead of being installed and operated on a drive system. Then, a new sensor assembly 206 is calibrated against the reference calibration target assembly 202, generating a sensor assembly calibration file 204, and a new target assembly 205 is calibrated against the reference calibration sensor assembly 200, generating a target assembly calibration file 203. The new sensor assembly 206 and the new target assembly 205 may be, e.g., recently manufactured or recently acquired, and it may be inconvenient to combine the two for purposes of calibration, or less convenient than combining with the stored reference calibration sensor assembly 200 and the reference target assembly 202.

By combining the calibration data together from the target assembly calibration file 203, the reference calibration file 201, and the sensor assembly calibration file 204, the new sensor assembly 206 and the new target assembly 205 can be properly calibrated, without needing to be calibrated together. For example, a sensor processing unit or other appropriate computer system can combine the data from the target assembly calibration file 203, the reference calibration file 201, and the sensor assembly calibration file 204 to generate new calibration values for the combination of the new sensor assembly 206 and the new target assembly 205. Although the new calibration values can be stored in a new calibration file 207, the new calibration file 207 does not need to be generated or stored on the aircraft since the calibration values can be determined from the target assembly calibration file 203, the reference calibration file 201, and the sensor assembly calibration file 204. A sensor processing unit can use the new calibration values in determining a torque signal when the new sensor assembly 206 and the new target assembly 205 are installed on a rotating drive system.

Figure 11:
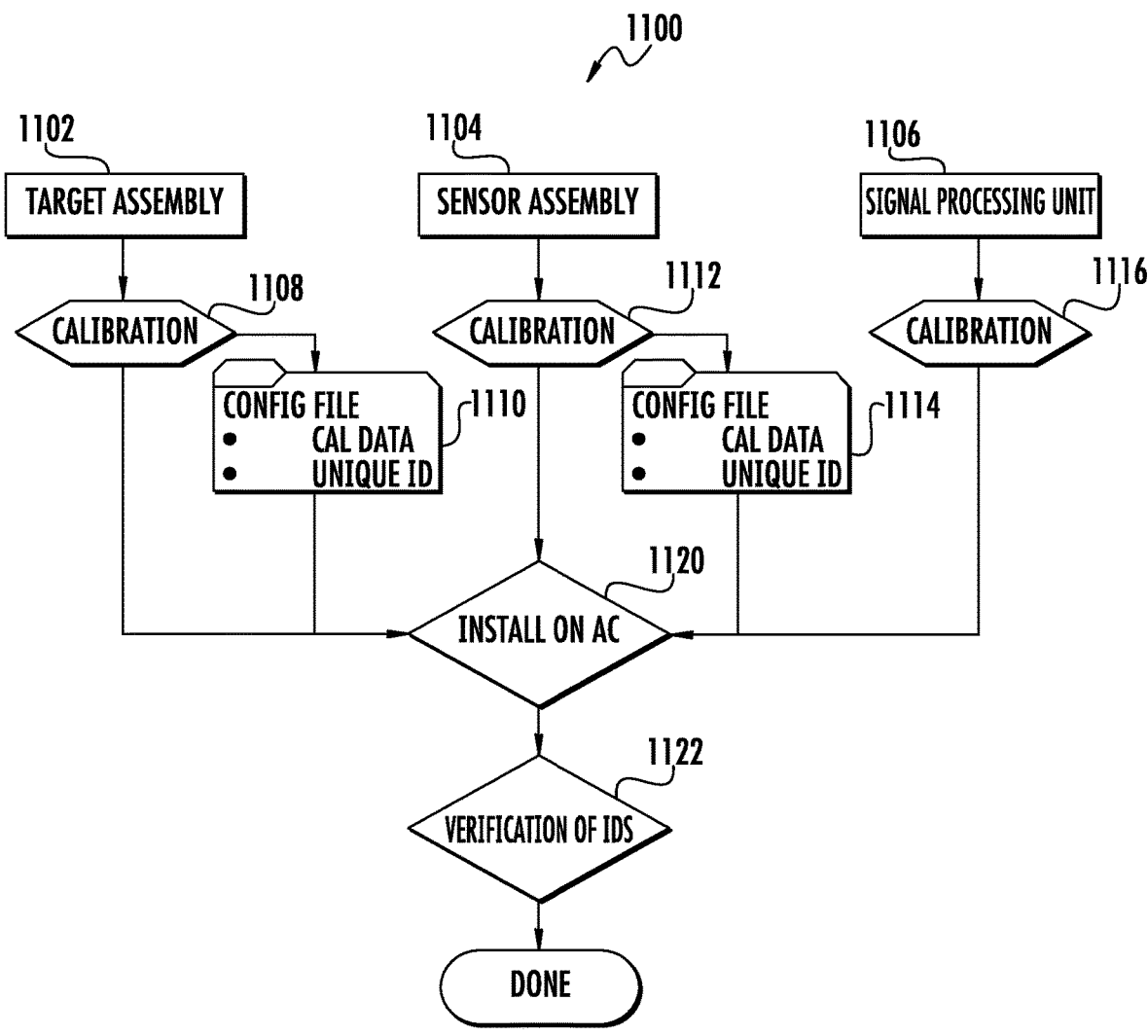
FIG. 11 is a flow diagram of an example method for verifying calibration data.

FIG. 11 is a flow diagram of an example method 1100 for verifying calibration data. The flow diagram illustrates a target assembly 1102, sensor assembly 1104, and signal processing unit 1106 for installation with a rotating drive system, e.g., on an aircraft.

A calibration process 1108 is performed on the target assembly 1102, resulting in a configuration file 1110 for the target assembly 1102 which can be stored on the signal processing unit 1106. The configuration file 1110 stores calibration data, e.g., calibration values specific to the physical structure of the target assembly 1102, and verification data, e.g., a unique identifier for the target assembly 1102. Similarly, a calibration process 1112 is performed on the sensor assembly 1104, resulting in a configuration file 1114 for the sensor assembly which also includes calibration data and verification data.

In some examples, a calibration process 1116 is performed on the signal processing unit 1106. The resulting calibration values can be stored directly in memory of the signal processing unit 1106. The calibration values for the signal processing unit 1106 can include values for, e.g., characterizing variations between electronic circuits present on signal processing units.

The method 1100 includes installing the target assembly 1102, sensor assembly 1104, and signal processing unit 1106 on a rotating drive system (1120). The method 1100 includes verifying that the target calibration data corresponds to the target assembly 1102 and that the sensor calibration data corresponds to the sensor assembly 1104 (1122).

Verifying the calibration data, in general, includes comparing the verification data within a calibration file to verification data obtained from the installed target assembly 1102 and the installed sensor assembly 1104. The verification data can be any appropriate type of data, e.g., unique identifiers or CRC values. The sensor processing unit 1106 can verify the calibration data using the appropriate technique based on the type of verification data. In some examples, verifying the calibration data includes receiving operator input, e.g., from aircraft maintenance personnel, specifying verification data for the target assembly 1102 or the sensor assembly 1104. The method 1100 can include verifying the calibration data once, at the time of installation, or at regular intervals or at any appropriate times.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A system for measuring torque on a drive train component of a rotating drive system, the system comprising:
    a target assembly configured to rotate with the drive train component, the target assembly comprising two target wheels, wherein a plurality of sensor targets is circumferentially distributed around each target wheel of the two target wheels;
    a sensor assembly located proximate to the target assembly, the sensor assembly comprising a plurality of sensors mounted radially around the drive train component, wherein the plurality of sensors is configured to detect the plurality of sensor targets as the target assembly rotates with the drive train component; and
    a sensor processing unit configured for:
        receiving target calibration data that is matched to the target assembly implemented in the system, wherein the target calibration data comprises unique verification data;
        receiving sensor calibration data that is matched to the sensor assembly implemented in the system, wherein the sensor calibration data comprises unique sensor verification data;
        verifying, using the unique verification data, that the target calibration data corresponds to and matches the target assembly implemented in the system, the unique verification data being used to distinguish the target assembly implemented in the system from other target assemblies sharing a same assembly design;
        verifying, using the unique sensor verification data, that the sensor calibration data corresponds to and matches the sensor assembly implemented in the system, the unique sensor verification data being used to distinguish the sensor assembly implemented in the system from other sensor assemblies sharing a same assembly design; and
        receiving sensor signals from the sensor assembly; and
        outputting a torque signal based on the sensor signals, the target calibration data, and the sensor calibration data.

2. The system of claim 1, wherein the sensor processing unit is configured for:
    measuring timing data associated with the rotation of the target assembly using the sensor signals; and
    determining the torque signal based on the timing data.

3. The system of claim 1, wherein the target calibration data comprises a particular slope and a particular offset measured for the target assembly implemented in the system.

4. The system of claim 1, wherein:
    the target calibration data is embedded as bitwise data in the sensor targets;
    the sensor assembly is configured to read the bitwise data and provide the bitwise data to the sensor processing unit; and
    the sensor processing unit is configured for decoding the bitwise data received from the sensor assembly.

5. The system of claim 1, wherein:
    the target assembly includes an additional set of sensor targets axially displaced from the sensor targets and embedded with bitwise data;
    one or more additional sensors of the sensor assembly are configured to read the bitwise data and provide the bitwise data to the sensor processing unit; and
    the sensor processing unit is configured for decoding the bitwise data received from the sensor assembly.

6. The system of claim 1, wherein the sensor processing unit is configured for verifying the target calibration data by identifying a unique timing pattern embedded in the target assembly.

7. The system of claim 6, wherein the unique timing pattern is embedded in the target assembly by virtue of irregular spacing between the sensor targets.

8. The system of claim 1, wherein the drive train component comprises a shaft or a coupling.

9. The system of claim 1, comprising first and second external portable memory devices coupled to first and second slots that electrically interface with the sensor processing unit, wherein the sensor processing unit is configured to receive the target calibration data from the first external portable memory device and the sensor calibration from the second external portable memory device.

10. The system of claim 9, wherein the first and second slots are located within the sensor processing unit.

11. The system of claim 9, wherein the first and second slots are located remotely from the sensor processing unit and electrically interface with the sensor processing unit through a cable.

12. The system of claim 1, comprising a memory device attached to the sensor assembly and electrically coupled to the sensor processing unit through a communications port, wherein the sensor processing unit is configured for receiving data from the memory device.

13. The system of claim 1, comprising a memory device attached to the sensor assembly and electrically coupled to the sensor processing unit through a communications port, wherein verifying that the sensor calibration data corresponds to and matches the sensor assembly comprises verifying the sensor calibration data using the unique sensor verification data, which is stored within the memory device.

14. The system of claim 1, comprising a memory device attached to the sensor assembly and electrically coupled to the sensor processing unit through a communications port, wherein the sensor processing unit is configured for receiving both the sensor calibration data and the unique sensor verification data for the sensor calibration data from the memory device.

15. The system of claim 1, wherein;
the sensor assembly includes a sensor assembly connector comprising electrical pins with unique cross-resistance values; and
the sensor processing unit is configured for reading the unique cross-resistance values and using the unique cross-resistance values when verifying that the sensor calibration data corresponds to and matches the sensor assembly.

16. The system of claim 1, wherein:
verifying that the target calibration data corresponds to and matches the target assembly implemented in the system;
comparing the unique verification data for the target assembly to obtained verification data from the target assembly; and
verifying that the sensor calibration data corresponds to and matches the sensor assembly implemented in the system comprises comparing the unique sensor verification data for the sensor assembly to obtained verification data from the sensor assembly.

17. The system of claim 1, wherein:
the target calibration data is received from the target assembly;
the sensor calibration data is received from the sensor assembly; and
the sensor processing unit is configured for automatically reconfiguring the system, using the target calibration data and/or the sensor calibration data, without user intervention when the target assembly is replaced with a different target assembly and/or when the sensor assembly is replaced with a different target assembly.

18. The system of claim 1, wherein the sensor processing unit is configured for:
receiving a reference calibration file characterizing a combination between a reference target assembly and a reference sensor assembly;
receiving a sensor assembly calibration file characterizing a combination between the sensor assembly and the reference target assembly and a target assembly calibration file characterizing a combination between the target assembly and the reference sensor assembly; and
determining one or more calibration values for a combination between the sensor assembly and the target assembly based on the reference calibration file, the sensor assembly calibration file, and the target assembly calibration file.

19. The system of claim 1, wherein the sensor processing unit is configured for loading sensor processing unit calibration data from memory of the sensor processing unit and outputting the torque signal using the sensor processing unit calibration data.

20. A method for reconfiguring a system for measuring torque on a drive train component of a rotating system, the method comprising:
providing, as a part of the system, a first target assembly on the rotating drive system, so that the first target assembly rotates with the drive train component, the first target assembly comprising two target wheels, wherein a plurality of sensor targets is circumferentially distributed around each target wheel of the two target wheels;
providing, as a part of the system, a sensor assembly located proximate to the target assembly, the sensor assembly comprising a plurality of sensors mounted radially around the drive train component;
detecting, using the plurality of sensors of the sensor assembly, the plurality of sensor targets as the first target assembly rotates with the drive train component;
providing, as a part of the system, a sensor processing unit;
receiving, by the sensor processing unit, first target calibration data that is matched to the first target assembly implemented in the system, wherein the target calibration data comprises unique first target verification data;
receiving, by the sensor processing unit, sensor calibration data that is matched to the sensor assembly implemented in the system, wherein the sensor calibration data comprises unique sensor verification data;
verifying, by the sensor processing unit and using the unique first target verification data, that the first target calibration data corresponds to and matches the first target assembly implemented in the system, the unique first target verification data being used to distinguish the first target assembly implemented in the system from other target assemblies sharing a same assembly design;
verifying, by the sensor processing unit and using the unique sensor verification data, that the sensor calibration data corresponds to and matches the sensor assembly implemented in the system, the unique sensor verification data being used to distinguish the sensor assembly implemented in the system from other sensor assemblies sharing a same assembly design;
receiving, by the sensor processing unit, sensor signals from the sensor assembly;
outputting a torque signal based on the sensor signals, the first target calibration data, and the sensor calibration data;
replacing the first target assembly with a second target assembly; receiving, by the sensor processing unit, second target calibration data that is matched to the second target assembly implemented in the system, wherein the second target calibration data comprises unique second target verification data; and
verifying, by the sensor processing unit and using the unique second target verification data, that the second target calibration data corresponds to and matches the second target assembly implemented in the system, the unique second target verification data being used to distinguish the second target assembly from other target assemblies sharing a same assembly design.

21. A method for reconfiguring a system for measuring torque on a drive train component of a rotating system, the method comprising:

provinding, as a part of the system, a target assembly on the rotating drive system, so that the target assembly rotates with the drive train component, the target assembly comprising two target wheels, wherein a plurality of sensor targets is circumferentially distributed around each target wheel of the two target wheels;

providing, as a part of the system, a first sensor assembly located proximate to the target assembly, the first sensor assembly comprising a plurality of sensors mounted radially around the drive train component;

detecting, using the plurality of sensors of the first sensor assembly, the plurality of sensor targets as the target assembly rotates with the drive train component;

providing, as a part of the system, a sensor processing unit;

receiving, by the sensor processing unit, target calibration data that is matched to the target assembly implemented in the system, wherein the target calibration data comprises unique verification data;

receiving, by the sensor processing unit, first sensor calibration data that is matched to the first sensor assembly implemented in the system, wherein the first sensor calibration data comprises unique first sensor verification data;

verifying, by the sensor processing unit and using the unique target verification data, that the target calibration data corresponds to and matches the target assembly implemented in the system, the unique target verification data being used to distinguish the target assembly implemented in the system from other target assemblies sharing a same assembly design;

verifying, by the sensor processing unit and using the unique first sensor verification data, that the first sensor calibration data corresponds to and matches the first sensor assembly implemented in the system, the unique first sensor verification data being used to assembly implemented in the system the first sensor assembly from other sensor assemblies sharing a same assembly design;

receiving, by the sensor processing unit, sensor signals from the first sensor assembly;

outputting a torque signal based on the sensor signals, the target calibration data, and the first sensor calibration data;

replacing the first sensor assembly with a second sensor assembly;

receiving, by the sensor processing unit, second sensor calibration data that is matched to the second sensor assembly to the sensor processing unit implemented in the system, wherein the second sensor calibration data comprises unique second sensor verification data; and verifying, by the sensor processing unit and using the unique second sensor verification data, that the second sensor calibration data corresponds to and matches the second sensor assembly implemented in the system, the unique second sensor verification data being used to distinguish the second sensor assembly from other sensor assemblies sharing a same assembly design.

\* \* \* \* \*